United States Patent [19]

Kawasaki et al.

[11] Patent Number: 5,349,409
[45] Date of Patent: Sep. 20, 1994

[54] PHOTOGRAPHING LENS

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 53,816

[22] Filed: Apr. 29, 1993

Related U.S. Application Data

[63] Continuation of Ser. No. 726,801, Jul. 8, 1991, abandoned.

[30] Foreign Application Priority Data

Jul. 6, 1990 [JP]  Japan .................. 2-178829

[51] Int. Cl.⁵ .............................................. G03B 1/18
[52] U.S. Cl. ................................ 354/195.12; 354/289.1
[58] Field of Search ........................... 354/400-409, 354/ 95.1–195.12, 412, 286, 289.1–289.12

[56] References Cited

U.S. PATENT DOCUMENTS

| | | | |
|---|---|---|---|
| 4,477,164 | 10/1984 | Nakai et al. | 354/286 |
| 4,509,842 | 4/1985 | Taniguchi et al. | 354/402 |
| 4,560,267 | 12/1985 | Nakai et al. | 354/412 |
| 4,602,861 | 7/1986 | Taniguchi et al. | 354/403 |
| 4,673,275 | 6/1987 | Nakai et al. | 354/412 |
| 4,841,322 | 6/1989 | Kawasaki | 354/400 |
| 4,897,683 | 1/1990 | Suzuki et al. | 354/400 |
| 4,945,376 | 7/1990 | Kawasaki et al. | 354/400 |
| 5,036,349 | 7/1991 | Suzuki et al. | 354/402 |
| 5,065,175 | 11/1991 | Suzuki et al. | 354/400 |
| 5,066,969 | 11/1991 | Kawasaki et al. | 354/402 |
| 5,126,780 | 6/1992 | Satou et al. | 354/446 |
| 5,159,370 | 10/1992 | Takahashi | 354/195.12 |
| 5,166,717 | 11/1992 | Kawasaki et al. | 354/195.11 |
| 5,170,200 | 12/1992 | Kawasaki et al. | 354/400 |
| 5,170,203 | 12/1992 | Kawasaki et al. | 354/402 |
| 5,181,061 | 1/1993 | Kawasaki et al. | 354/400 |
| 5,182,591 | 1/1993 | Kawasaki | 354/195.1 |
| 5,198,847 | 3/1993 | Takahashi | 354/195.12 |
| 5,223,877 | 6/1993 | Kawasaki et al. | 354/286 |

*Primary Examiner*—David M. Gray
*Attorney, Agent, or Firm*—Sandler, Greenblum & Bernstein

[57] ABSTRACT

A photographing lens which can be detachably attached to a camera body includes a memory for storing steady lens data which is constant, regardless of photographing conditions, and variable lens data which vary in accordance with the photographing conditions. A data reader reads the steady lens data and the variable lens data corresponding to the photographing conditions and then outputs the data read from the memory.

12 Claims, 13 Drawing Sheets

PHOTOGRAPHING LENS

This application is a continuation-in-part, of application No. 07/726,801 filed Jul. 8, 1991, now abandoned.

TABLE A

| Address | LC |  |  |  |  |  |  |  |  |  |  |  |  |  |  |  |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 00 | 1A | 94 | 00 | 65 | 83 | 02 | 11 | 84 | 51 | 6A | 69 | 3C | 01 | 30 | 95 | 03 |
| 10 | 1A | 94 | 00 | 65 | 93 | 03 | 12 | 84 | 51 | 6A | 69 | 34 | 0D | 30 | 8D | 03 |
| 20 | 1A | 94 | 00 | 69 | 93 | 24 | 13 | 84 | 51 | 6A | 69 | 30 | 19 | 30 | 7C | 03 |
| 30 | 1A | 94 | 00 | 79 | A3 | A5 | 14 | 84 | 51 | 6A | 60 | 2C | 21 | 30 | 6B | 03 |
| 40 | 1A | 94 | 00 | 9D | A3 | E6 | 15 | 84 | 51 | 6A | 60 | 29 | 2D | 30 | 62 | 03 |
| 50 | 1A | 94 | 00 | 42 | B3 | E7 | 16 | 84 | 51 | 6A | 60 | 25 | 35 | 30 | 5A | 03 |

BACKGROUND OF THE INVENTION

1. Field of the Invention

The present invention relates to a photographing lens having a memory in which lens data peculiar to the photographing lens is stored.

2. Description of Related Art

A photographing lens (interchangeable lens) in a recent single lens reflex camera having an automatic focusing device is usually provided with a memory (e.g., ROM) in which lens data peculiar to the photographing lens is stored. The camera body is provided with a control means which communicates with the memory to read the lens data stored therein and performs predetermined arithmetic operations (exposure calculation and AF calculation) for calculating exposure factors (diaphragm value, shutter speed, etc.), the amount of defocus, and the amount of displacement of the focusing lens to be moved, etc., in accordance with the lens data which is based on predetermined algorithm and formula.

The lens data includes, for example, an apex value Avmin at an open aperture (open F-number), an apex value Avmax at a minimum aperture (maximum F-number), focal length data f, and object distance data, etc.

Part of the lens data varies in accordance with the photographing conditions. Namely, the lens data partly varies in accordance with the object distance in the case of a single focus lens, and varies in accordance with the focal length in the case of a zoom lens, respectively.

Accordingly, in the case of a single focus lens, the object distance is divided into a plurality of object distance zones, so that the lens data corresponding to the object distance zones are stored in predetermined memory areas of the ROM. In the case of a zoom lens, the focal length is divided into a plurality of focal length zones, so that the lens data corresponding to the focal length zones are stored in predetermined memory areas of the ROM. Namely, the lens data is stored for every photographing condition in a page-address system.

The object distance and the focal length are detected by an object distance detecting device and a focal length detecting device, respectively, so that the lens data stored in the pages corresponding to the data thus detected is outputted to the camera body as renewed lens data.

Table A shows a lens ROM in which lens data corresponding to six focal length zones is stored for every page (area), by way of example. As can be seen from Table A, each line represents stored data of each page. The numerical values (00, 10, 20, 30, 40, 50) represent the page addresses corresponding to the six focal length zones.

To store all lens data corresponding to the plurality of object distance zones or focal length zones for every page in the memory means, the latter must have a large memory (storing capacity).

SUMMARY OF THE INVENTION

The primary object of the present invention is to provide a photographing lens in which lens data corresponding to various photographing conditions can be stored in a small memory.

The inventors of the present invention have focused on some constant lens data which does not vary, even if the focal length or object distance varies.

To achieve the object mentioned above, according to the present invention, there is provided a photographing lens which can be detachably attached to a camera body and which comprises a memory means for storing steady lens data which is constant regardless of photographing conditions and variable lens data which varies in accordance with the photographing conditions, and a data reading means for reading the steady lens data and the variable lens data corresponding to the photographing conditions from the memory means to output the read data.

In this arrangement, since only one set of steady lens data, which does not vary in accordance with the photographing conditions, such as the focal length and the object distance can be commonly stored in the memory means, a large memory is not necessary.

Preferably, the memory means comprises of a ROM which has a steady data storing area in which the steady lens data can be stored at a predetermined address and variable data storing areas in which the variable lens data can be stored at predetermined addresses. The memory address of the variable lens data corresponding to the photographing conditions can also be stored in the steady data storing area of the ROM.

In this configuration, the steady lens data corresponding to the photographing conditions can be directly obtained from the steady data storing area, regardless of the change of the photographing conditions. The variable lens data can be obtained in accordance with the address data stored in the steady data storing area at a predetermined address from the variable data storing areas.

The present disclosure relates to subject matter contained in Japanese patent application No. HEI 2-178829 (filed on Jul. 6, 1990), which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
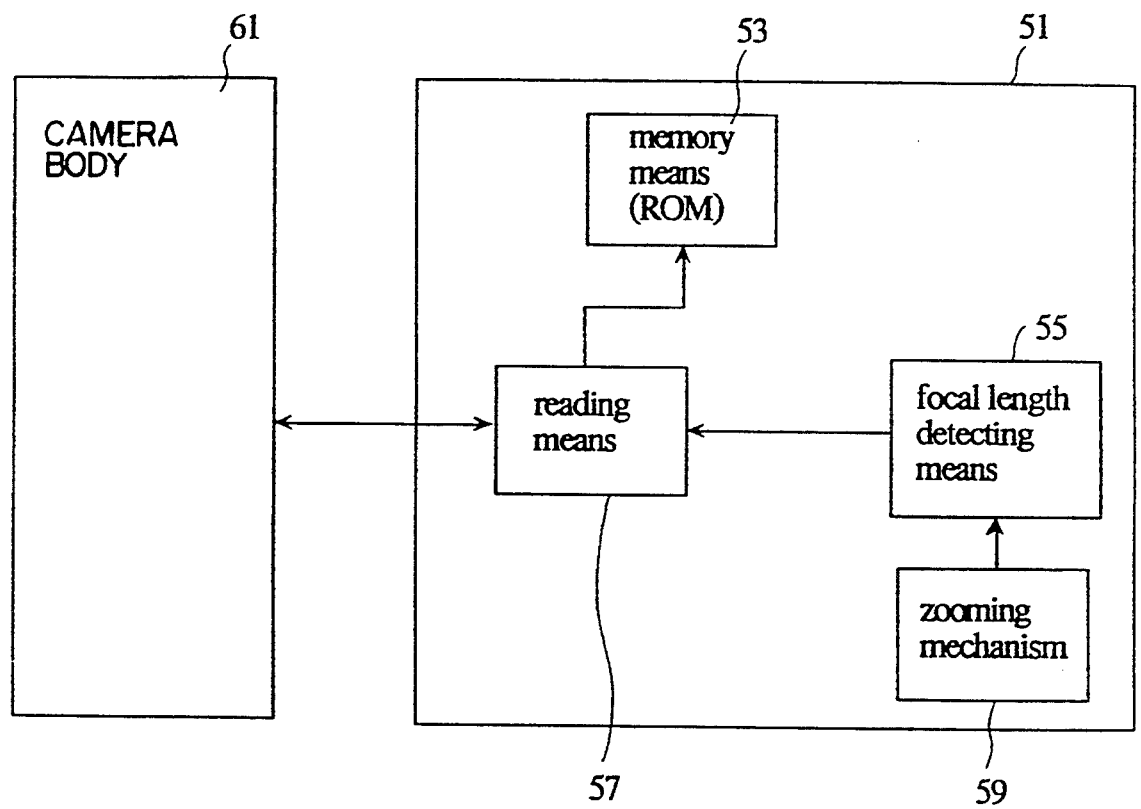
FIGS. 1 is a block diagram of a photographing lens according to the present invention.

FIG. 1 is a block diagram showing the main component of a zoom lens 51, according to an aspect of the present invention.

The zoom lens 51 has different lens characteristics, depending on a plurality of photographing conditions. The photographing conditions include, for example focal length data and object distance data. The lens characteristics include, for example, open F-number (open aperture) and maximum F-number, etc., as a diaphragm value, and K value as data of an automatic focus adjustment, etc. K value referred to means a function or a numerical value which determines the displacement of a focusing lens necessary to move an image plane formed by the zoom lens 51 through a unit displacement.

The zoom lens 51 has a memory means (ROM) 53, in which common steady lens data and variable lens data are stored. The steady lens data and the variable lens data are read by a lens data reading means 57, in accordance with the photographing conditions detected by the object distance detecting means 55, which constitutes a photographing condition detecting means, and are outputted to camera body 61.

Figure 2:
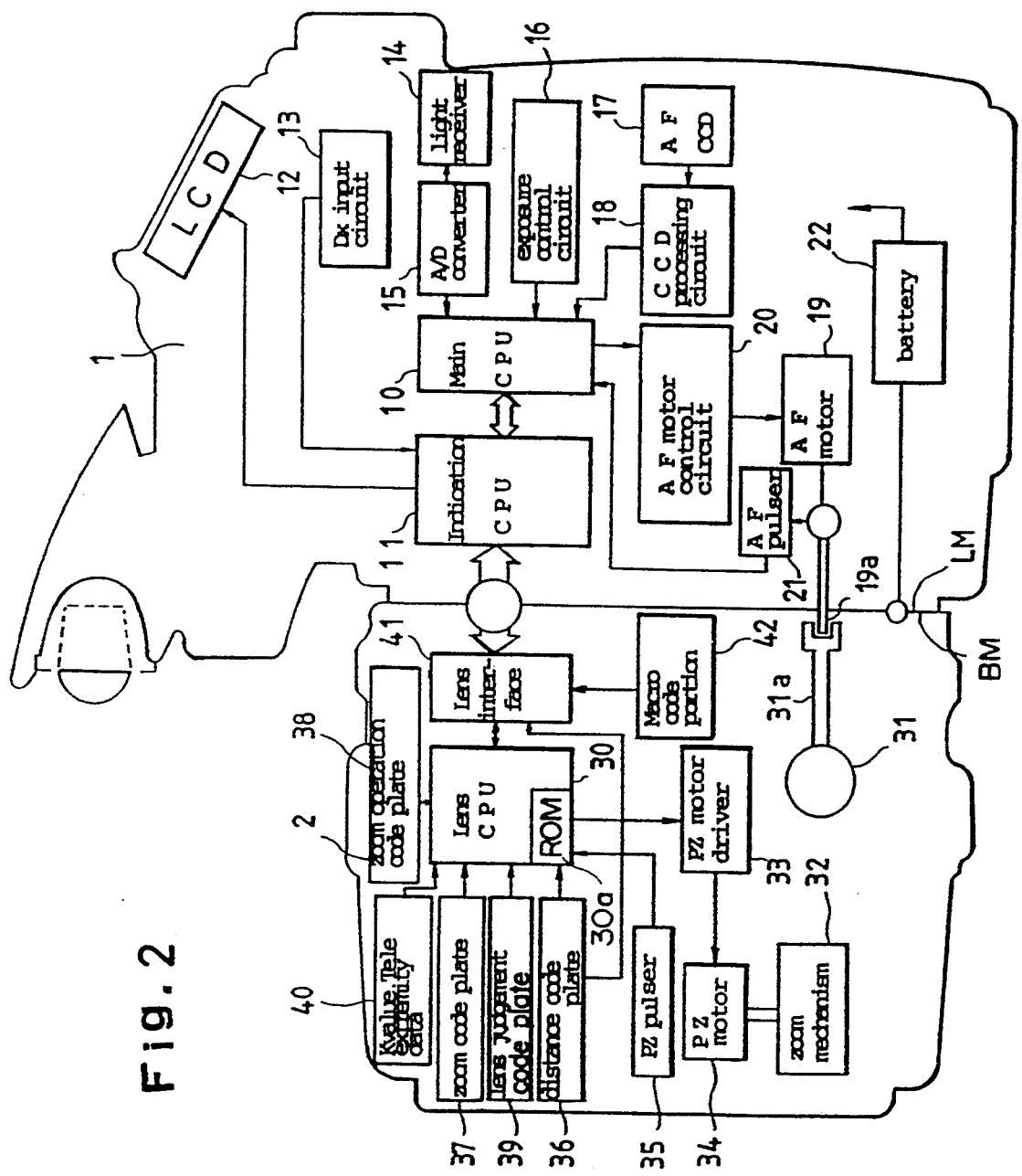
FIG. 2 is a block diagram of the main component of the camera system according to the present invention.
Figure 3:
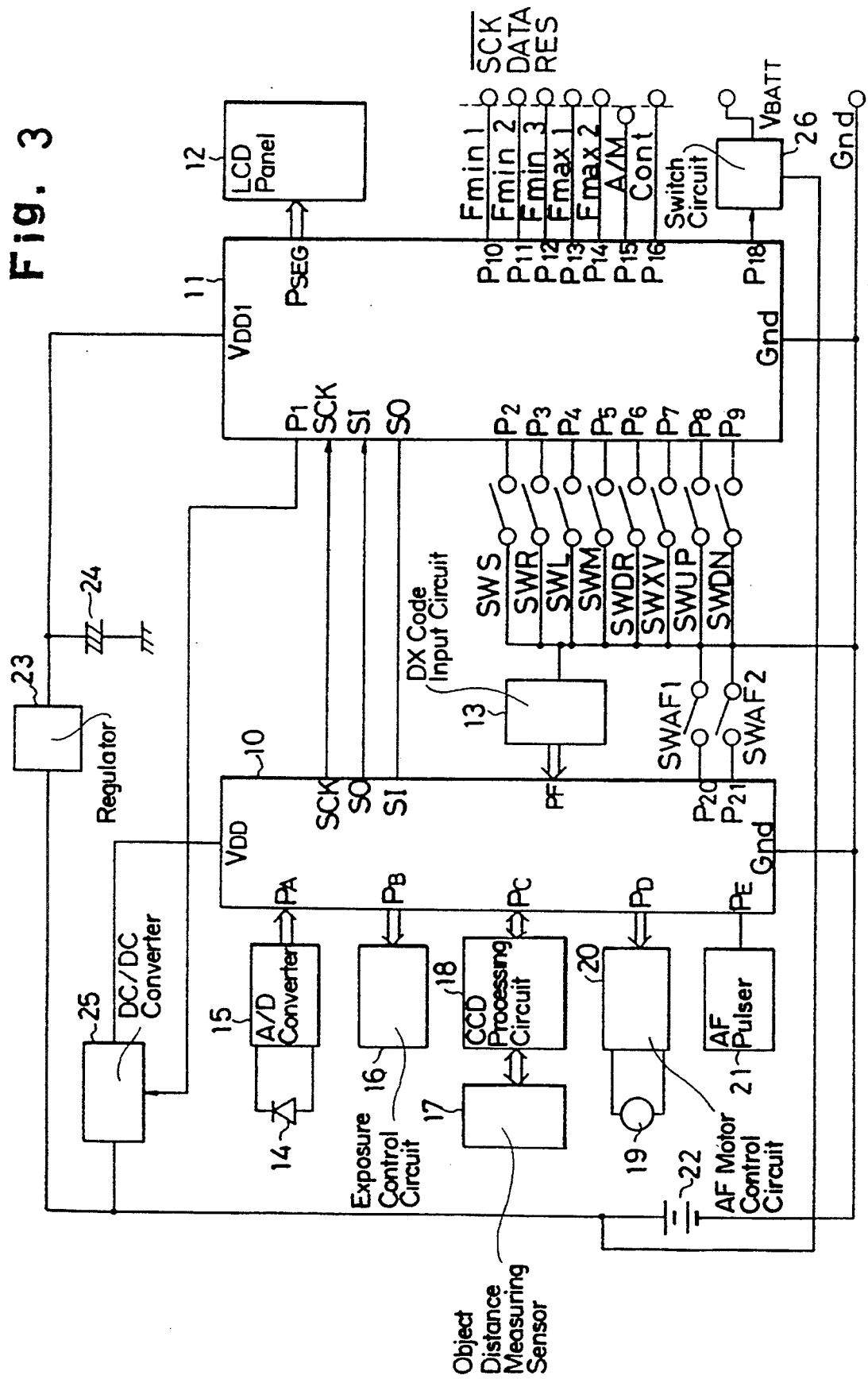
FIG. 3 is a block diagram of the camera body's main circuit arrangement of the camera system shown in FIG. 2.
Figure 4:
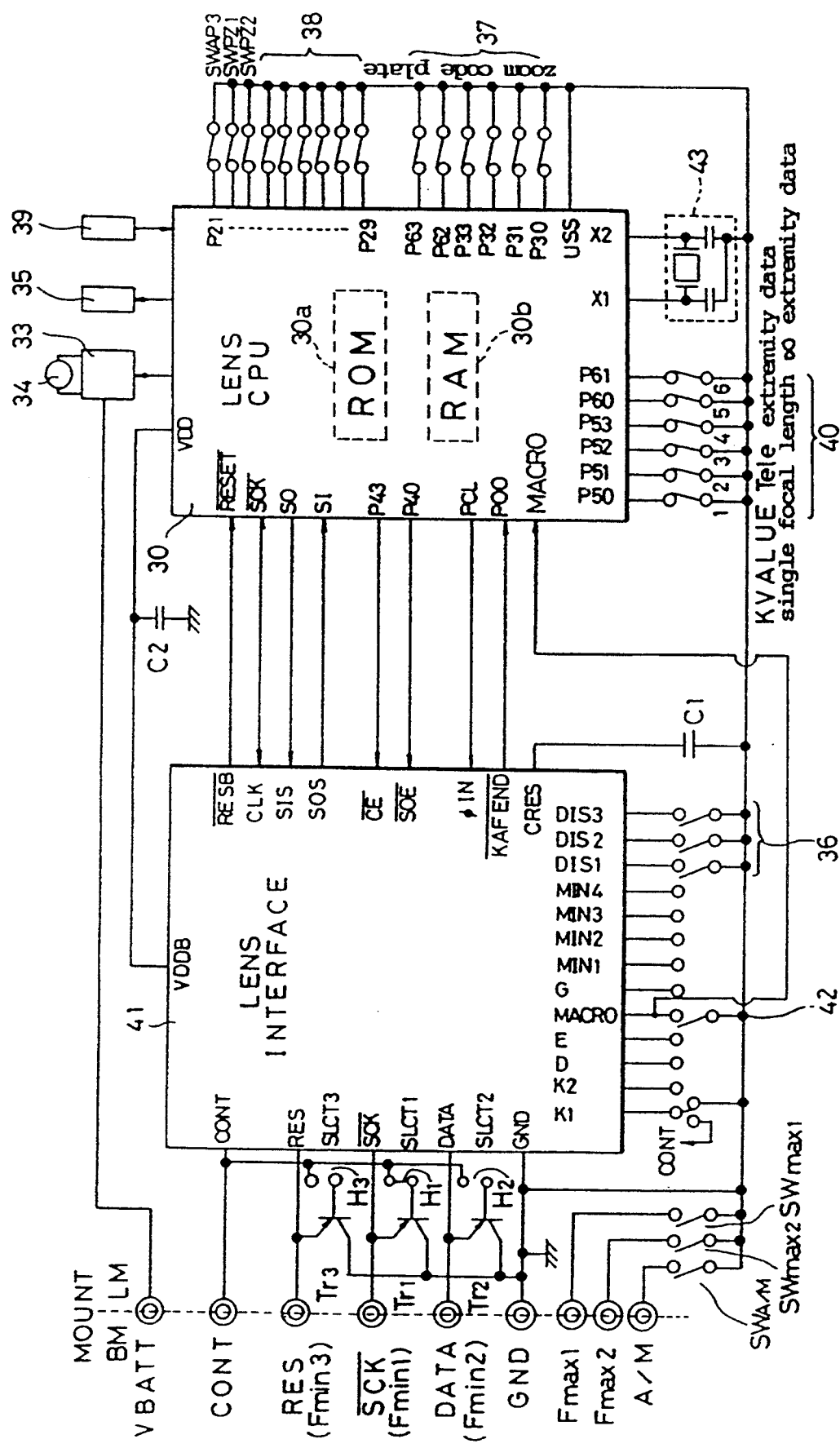
FIG. 4 is a block diagram of the main circuit arrangement of a photographing lens of the camera system shown in FIG. 2.
Figure 5:
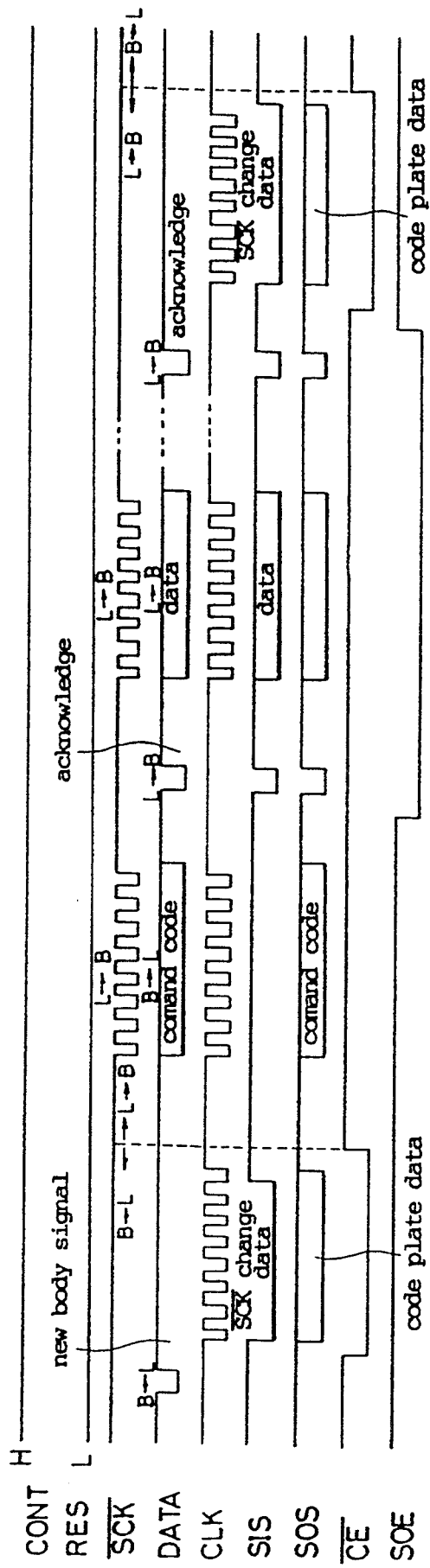
FIG. 5 is a timing chart showing communication between the camera body and photographing lens of the camera system according to the present invention.
Figure 6A:
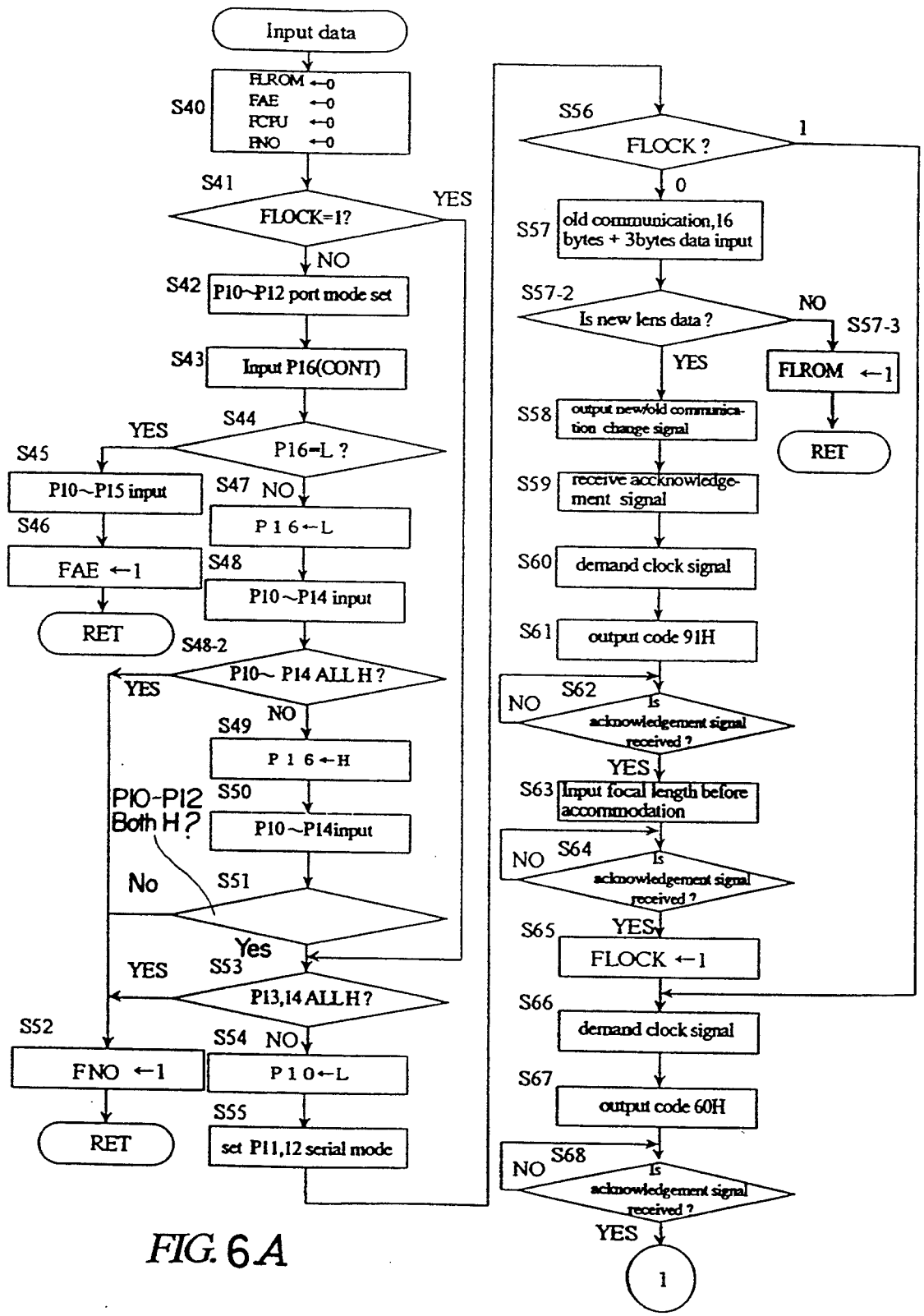
FIG. 6A, 6B and 6C are flow charts of communication operations on the camera body side.
Figure 6B:
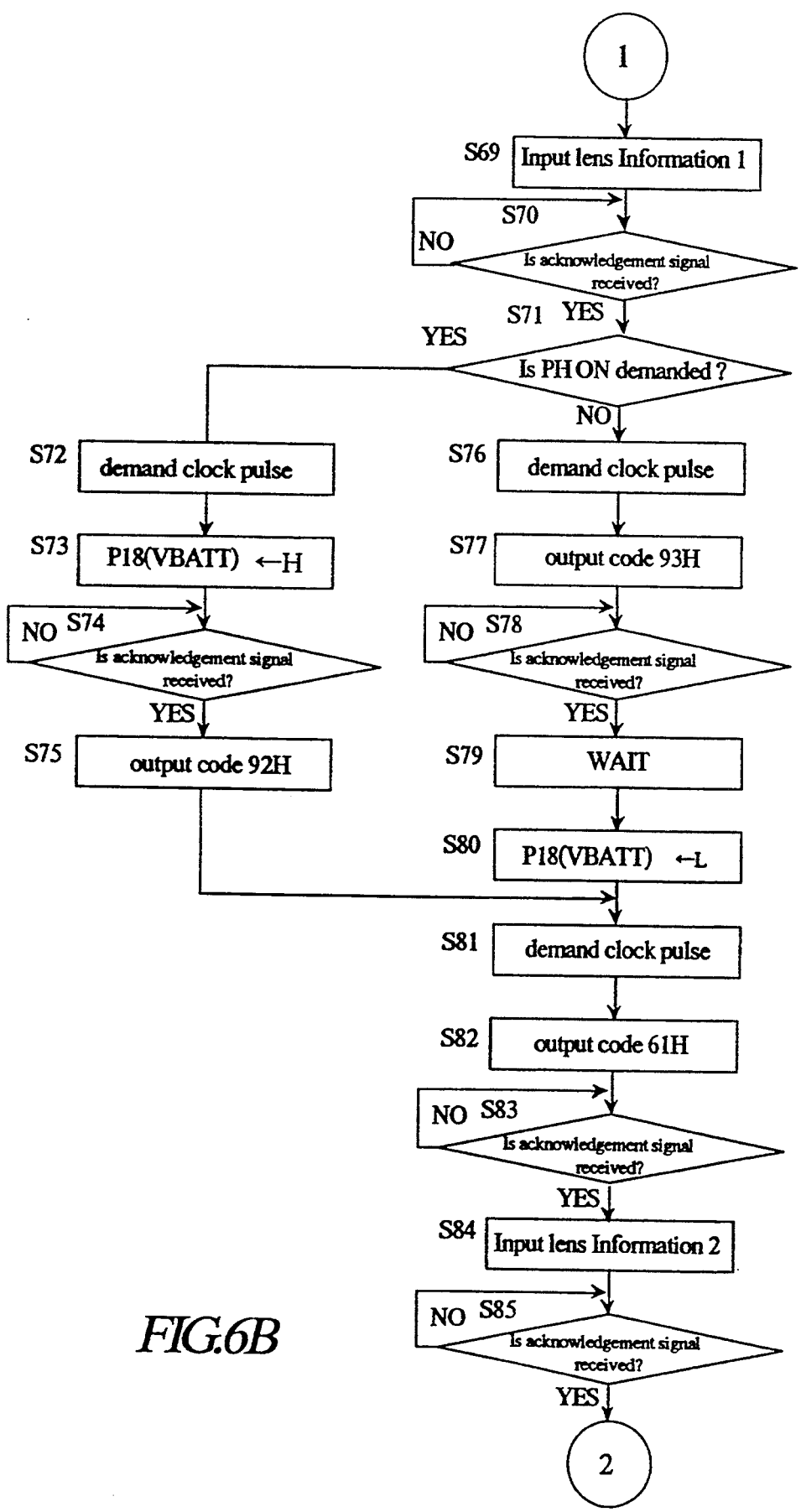
Figure 6C:
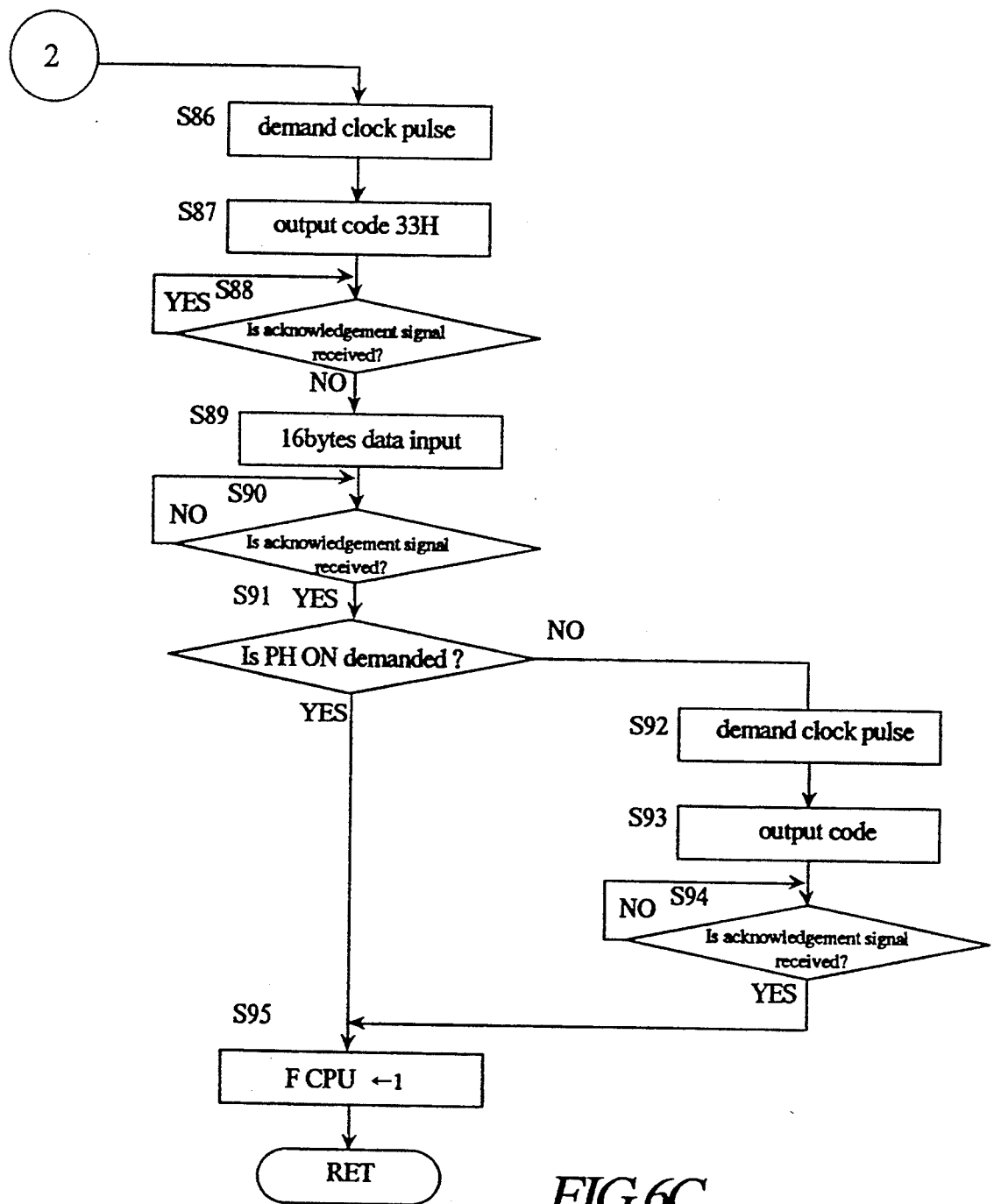

FIGS. 2 through 4 show a single lens reflex camera to which the present invention is applied. FIG. 2 shows a block diagram of a main circuit component of a single lens reflex camera having a zoom lens 2 according to the present invention.

Specific lens data of the zoom lens 2 varies in accordance with a change in the focal length. As shown in Table B, in the illustrated embodiment, the variable focal length is divided into a plurality of focal length zones, and the constant lens data common to the focal length zones is stored in ROM 30a of the lens CPU 30 at a fixed data memory area (address "00") as steady lens data. The variable lens data which varies for every focal length zone is stored in the ROM 30a at addresses (addresses "10", ...) different from the address of the steady lens data. The lens CPU 30 constitutes a lens data reading means and the ROM 30a constitutes a memory means.

TABLE B

| Address | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 00 | 1A | 94 | 00 | (10) | (16) | () | () | 84 | 51 | 6A | () | () | () | 30 | () | () |

| Address | |
|---|---|
| 10 | 65 |
| 11 | 65 |
| . | . |
| . | . |
| 15 | 42 |
| 16 | 83 |
| 17 | 93 |
| . | . |
| . | . |
| 21 | B3 |

The variable lens data includes, for example, the focal length, the object distance, the open F-number, the minimum F-number and the K value, etc.

The following discussion will be directed to an embodiment applied to a single lens reflex camera system, in which the exposure factors, etc., are calculated in accordance with the lens data inputted from the zoom lens 2 to take a picture.

Camera body 1 has a main CPU 10 and an indication CPU 11 that functions as a control means. The main CPU 10 generally controls the whole camera system and performs arithmetic operations on various data necessary for taking a picture. The indication CPU 11 functions not only as an interface (data communication) to input data by switch members and to transmit and receive data (signals) to and from the zoom lens 2, but also as a controller to control the indication of the photographing data.

The indication CPU 11 is connected to an LCD panel 12 that indicates various photographing data, and a DX code input circuit 13 that selectively reads film data, of which will at least be ISO, sensitivity data, from DX codes provided on the surface of a parrone of the film. A light receiver 14, that receives light incident thereon through the zoom lens 2 to output analog signals of object luminance in accordance with an amount of light received, is connected to the main CPU 10 through an A/D converter 15.

The main CPU 10 is also connected to an exposure control circuit 16 that drives and controls a shutter mechanism (not shown) and a diaphragm mechanism (not shown), etc., in accordance with input photographing data, a CCD processing circuit 18 that detects a focusing state of the zoom lens 2 in response to focus data (defocus data) of an object to be taken, outputted from an automatic focusing CCD object distance measuring sensor 17, an AF motor control circuit 20 that drives an AF motor 19, and an AF pulser 21 that detects the angular displacement (rotational angle or the number of revolutions) of the AF motor 19 to generate pulses corresponding to the angular displacement. The object distance measuring sensor 17 receives light of the object that is incident through the zoom lens 2 to output a predetermined focus information signal (defocus signal).

The AF motor 19 transmits the drive force to the zoom lens 2 through a coupler 19a provided on a body mount BM of o the camera body so as to project therefrom and a coupler 31a provided on a lens mount LM of the zoom lens 2 when the connection between the couplers 19a and 31a is established.

A battery 22 supplies not only electrical power to electronic components and electronic circuits within the camera body 1, but also to a motor, electronic components and electronic circuits within the zoom lens 2.

In the zoom lens 2 are provided the lens CPU 30 as a lens controller, a focusing mechanism 31 that rotates a focus adjusting cam ring (not shown) to relatively move the focusing lens groups in the optical axis direction so as to effect the focusing, of the lens and a zooming mechanism 32 which rotates a zoom ring (not shown) to relatively move at least two groups of variable power lenses in the optical axis direction to effect a zooming of the lens.

The focusing mechanism 31 is connected to the coupler 31a, which is electrically connected to the coupler 19a when the zoom lens 2 is attached to the camera body 1 so as to transmit a rotational drive of the AF motor 19 to the focusing mechanism 31. The focusing mechanism 31 rotates the focus needed adjusting cam ring with the driving force to drive the focusing lens to effect the focusing operation.

The couplers 31a and 19a can be disconnected from one another by a disengaging means (not shown), so that a photographer can manually rotate the focus adjusting operation ring to adjust the focus (manual focusing) of the lens.

The zooming mechanism 32 is driven by a PZ (power zoom) motor 34, which is in turn driven by a PZ motor driving portion 33. The operation of the PZ motor driving portion 33 is controlled by the lens CPU 30 or a zoom switch SWPZ2 (shown in FIG. 4) in accordance with the power zoom mode. In the manual zoom mode, the operation of the PZ motor driving portion 33 is controlled by the output of a zoom operation code plate 38 which is manually actuated by a photographer. The switching of the zoom mode between the power zoom mode and the manual zoom mode is effected by the lens CPU 30 in response to an ON/OFF signal of a zoom switch SWZM1.

To the lens CPU 30 are connected a PZ pulser 35 that generates a predetermined number of pulses in association with an angular displacement of the PZ motor 34, a distance code plate 36 that constitutes an initial value forming means to read the position data (object distance data) of the focus adjusting cam ring (focusing lens group) driven by the focusing mechanism 31, a zoom code plate 37 that reads position data (focal length data) of the zooming cam ring (variable power lens group) driven by the zooming mechanism 32, and a zoom operation code plate 38 that inputs data of the direction and speed of the power zooming by the operation of the zoom operation switch. The distance code plate 36, the zoom code plate 37 and the lens CPU 30 constitute a photographing condition detecting means.

If the photographing lens is a single focus macro lens in which the displacement of the focusing lens is increased, the distance code plate 36 can be replaced with the zoom code plate 37 which can provide more information.

Furthermore, a lens judgement code plate 39 that determines the types of photographing lens 2 (zoom lens, single focus lens, or single focus macro lens, etc.), and a K value input member 40 (which inputs data of the K value at a telephoto extremity) are connected to the lens CPU 30.

In the illustrated embodiment, "K value" means the number of pulses of the AF pulser 21 necessary for moving an image plane formed by the photographing lens 2 through a unit displacement, but is not limited thereto.

The distance code plate 36 and the other code plates are usually comprised of code plates which are secured to a cam ring or the like and brushes which have a plurality of electrical contacts independently brought into slidable contact with the codes of the respective code plates which are attached to a stationary ring or the like. The positions of the cam ring, etc., are detected as bit information by a combination of the codes (combination of levels "H" and "L") with which the electrical contacts of the brushes come into contact.

A lens interface 41 is connected to a data input terminal of the lens CPU 30. The data communication between the lens CPU 30 and the indication CPU 11 is effected through the lens interface 41, to which a macro code member 42 which constitutes the initial value data forming means is connected, to input macro data thereto in the macro mode.

Circuit of Camera Body

The circuit arrangement of the camera body 1 will be described below in detail with reference to FIG. 3.

The voltage of the battery 22, which is controlled by a regulator 23 and which is backed up by a super capacitor 23, is supplied to terminal VDD1 of the indication CPU 11. The indication CPU 11 is always activated at a constant voltage input to the terminal VDD1.

Terminal P1 of the indication CPU 11 is connected to a DC/DC converter 25 which turns on and off and a the power source of the main CPU 10. Terminal P2 is connected to a photometer switch SWS which is turned ON when a shutter button (not shown) is depressed half-way. Terminals P3 and P4 of the indication CPU 11 are connected to a release switch SWR which is turned ON when the shutter button is fully depressed and a lock switch SWL, which is turned ON to bring the camera into a position suitable for photographing, respectively.

The DC/DC converter 25 is actuated when the lock switch SWL is turned ON and when the photometer switch SWS or the release switch SWR is turned ON. In accordance with a command from the indication CPU 11 upon inputting the lens data from the zoom lens 2, the DC/DC converter 25 supplies terminal VDD1 of the main CPU 10 with a reference constant voltage to thereby actuate the main CPU 10.

Terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of the switches SWM, SWDR, SWXV, SWUP, and SWDN. For instance, the exposure modes including a programmed exposure mode, an automatic exposure mode, and a manual exposure mode are selected in accordance with the operation of the mode switch SWM. Similarly, drive modes including a single shot mode and a continuous shot mode are selected in accordance with the operation of the drive switch SWDR. The selection modes can be successively varied in accordance with the operation of the up-switch SWUP and the down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG that are connected to an indicating LCD 12 through a bus line. The indicating LCD 12 indicates necessary photographing data in accordance with command of the indication CPU 11 when the lock switch SWL is turned ON.

Seven terminals, P10 through P16 of the indication CPU 11, are connected to electrical contacts Fmin1, Fmin2, Fmin3, Fmax1, Fmax2, A/M, and Cont provided on the body mount BM of the camera body. Terminal P18 of the indication CPU 11 is connected to a switch circuit 26.

The electrical contacts Fmin1, Fmin2 and Fmin3 function as communication terminals for data communication between the zoom lens 2 and the indication CPU 11. Namely, the electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively.

Terminals P10, P11 and P12 of the indication CPU 11 are always pulled up within the indication CPU 11.

The output of the switch circuit 26 is connected to terminal VBATT and functions as a switch for establishing and breaking the electrical connection between the battery 22 and terminal VBATT in accordance with the level of terminal P18. The terminal Gnd of the indication CPU 11 is connected to ground terminal Gnd of the battery 22.

The indication CPU 11 and the main CPU 10 communicate with each other through serial terminals SCK, serial-in terminals SI and serial-out terminals SO. In the data communication, data is transferred using command codes, as shown in Table 1 below. In Table 1, the left column represents data which is outputted from the indication CPU 11 to the main CPU 10, and the right column represents data which is transferred from the main CPU 10 to the indication CPU 11. These data are set based on the measurements of the object luminance and the object distance, etc., controlled by the main CPU 10.

TABLE 1

| Display CPU → Main CPU | Main CPU → Display CPU |
| --- | --- |
| mode set data | display Tv, Sv data |
| drive set data | film sensitivity information |
| exposure correction set data | AF accommodation pulse number data |
| lens CPU data, set Tv, Sv data | AF return-completion code |
| AF accommodation code | |
| AF return code | |
| AF return pulse number data | |
| AF accommodation, return | |

TABLE 1-continued

| Display CPU → Main CPU | Main CPU → Display CPU |
| --- | --- |
| code | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 13, respectively.

Terminal P20 of the main CPU 10 is connected to a first AF switch SWAF1, which selects an auto focus mode in which the focusing is automatically effected by the AF motor 19 and a manual focus mode in which the focusing is manually effected by a photographer. Terminal P21 of the main CPU 10 is connected to a second AF switch SWAF2 which switches the mode of the shutter release between a focus priority mode and a release priority mode.

The first and second AF switches SWAF1 and SWAF2 are mechanically associated with each other, so that for example, when the manual focus mode is selected by the first AF switch SWAF1, the second AF switch SWAF2 is switched to the release priority mode. Namely, when one of the AF switches SWAF1 and SWAF2 is turned ON, the other is turned OFF.

Circuit of Photographing Lens

The circuit arrangement of the electrical system provided in the zoom lens 2 will be explained below, with reference to FIG. 4.

The lens mount LM of the zoom lens 2 is provided with electrical contacts VBATT, CONT, RES (Fmin3), $\overline{SCK}$ (Fmin1), DATA (Fmin2), GND, Fmax1, Fmax2 and A/M, corresponding to the associated electrical contacts provided on the body mount BM when the zoom lens 2 is attached to the camera body 1. The electrical contacts of the lens mount designated are electrically connected to corresponding electrical contacts of the body mount.

Contact VBATT on the lens side is connected to the PZ driver (motor driving portion) 33, so that the power of the battery 22 is directly supplied to the PZ motor 34 through contact VBATT by the switching operation of the PZ driver 33.

Contacts Fmax1 and Fmax2 of the lens side function as a steady information transmitting means for transmitting a minimum aperture F-number data (maximum value) of two bits to both the camera body and to those contacts provided on an existing (old) AE lens. Namely, contacts Fmax1 and Fmax2 on the lens side are grounded through switches SWmax1 and SWmax2, so that minimum F-number data is formed in accordance with a combination of levels of the switches SWmax1 and SWmax2, depending on the ON/OFF states thereof in combination. Examples of combinations of the levels of the contacts Fmax1 and Fmax2 on the lens side and the minimum F-number are shown in Table 2 below.

TABLE 2

| F NO. | F max2 | F max1 |
| --- | --- | --- |
| 22 | 0 | 0 |
| 32 | 0 | 1 |
| 45 | 1 | 0 |

Contact A/M on the lens side functions to send auto/manual information of the diaphragm to the camera body 1 and is grounded through a selection switch SWA/M. The selection switch SWA/M is in association with the rotation of a diaphragm ring (not shown) of the zoom lens 2, so that, when the diaphragm ring is in the auto position or the manual position, the selection switch is turned ON or OFF, respectively.

Contacts Fmin1, Fmin2, and Fmin3 on the lens side function not only as a steady information transmitting means for transmitting the open F-number information of three bits to the camera body 1, or to those contacts provided on an existing (old) type AE lens, but also as data communication contacts between the camera body and zoom lens. Examples of the relation between the levels of the contacts Fmin1, Fmin2 and Fmin3 on the lens side and the open F-number are as shown in Table 3 below.

TABLE 3

| F NO. | F min3 | F min2 | F min1 |
| --- | --- | --- | --- |
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to contact CONT through fuse portions H1, H2 and H3, so as to establish and break the connection, respectively. The collectors of the transistors are grounded. It is possible to provide the fuse portions H1, H2 and H3 between the emitters and the lens contacts Fmin (Fmin1, Fmin2 and Fmin3).

To give both the steady information transmitting function and the data communication function on contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to lens contacts Fmin1, Fmin2 and Fmin3, and at the bases thereof to contact CONT through fuse portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of contact CONT to drop to ground in order to obtain the open F-number data from the lens contacts Fmin1, Fmin2 and Fmin3. As a result, a transistor (or transistors) Tr to which the fuse portion(s) is (are) connected is (are) turned On, so that the emitter(s) of the transistor(s) which has ( have ) been turned ON become(s) a high level "H", and the emitter(s) of the transistor(s) which has (have) not been turned ON become(s) a ground level "L". Namely, the transistors Tr are selectively turned ON or OFF in accordance with the connection of the fuse portions H1, H2 and H3 to change the level of the emitters thereof. Consequently, the three-bit open F-number data is outputted to the lens contacts Fmin1, Fmin2 and Fmin3.

Terminals CONT, RES, $\overline{\text{SCK}}$, DATA and GND of the lens interface 41 is connected to terminals CONT, Fmin3, Fmin1, Fmin2 and GND on the lens side, respectively.

Lens contact CONT is connected to the bases of the transistors Tr and to the terminal CONT of the lens interface 41, as mentioned above. The switching of the power supply from terminal CONT of the lens interface is effected through terminal RES (lens terminal Fmin3). After the data on the open F-number is read by the indication CPU 11 (when terminals CONT and RES become levels "H" and "L", respectively,) the power of a reference voltage is supplied to the lens CPU 30.

Terminals VDDB of the lens interface 41 is connected to terminal VDD of the lens CPU 30 through a capacitor C2, so that a constant voltage supplied from terminal CONT of the camera body 1 is supplied to the lens CPU 30.

Terminals DIS1, DIS2 and DIS3 of the lens interface 41 are connected to the distance code plate 36, which constitutes a photographing condition detecting means so that distance data signals of the object distance corresponding to the position of the focusing cam ring driven by the focusing mechanism 31 are inputted to terminals DIS1, DIS2 and DIS3.

Terminal MACRO of the lens interface 41 is connected to macro code portion 42, which functions as a macro switch which is turned ON when the zoom operation ring is actuated to switch the zoom lens 2 to the macro mode. When the zoom lens 2 is switched to the macro mode by the operation of the zoom operation ring, the macro code portion 42 can be formed as a part of the codes of the zoom code plate 37.

The input and output terminals of the lens interface 41 are connected to corresponding input and output terminals of the lens CPU 30. Reset terminal $\overline{\text{RESB}}$, clock terminal CLK, serial-in terminal SIS, serial-out terminal SOS, terminal $\overline{\text{CE}}$, terminal $\overline{\text{SOE}}$, terminal ΦIN, and terminal $\overline{\text{KAFEND}}$, of the lens interface 41 are connected to reset terminal $\overline{\text{RESET}}$, the serial clock terminal $\overline{\text{SCK}}$, serial-out terminal SO, serial-in terminal SI, terminal P43, terminal P40, terminal PCL, the terminal POO of the lens CPU 30, respectively. Terminal CRES of the lens interface 41 is grounded through a delay capacitor C1.

The lens CPU 30 controls the PZ motor 34 through the PZ driver 33 that is which connected to the control terminal thereof. The lens CPU 30 is also connected to the PZ pulser 35 and the lens judgement code 39.

Terminals P30, P31, P32 and P33 and terminals P62 and P63, of the lens CPU 30 are connected to the codes of the zoom code plate 37. The lens CPU 30 performs the arithmetic operation based on the input levels of terminals P30, P31, P32, P33, P62, and P63, in combination, to obtain the focal length data or the object distance data in case of a single focus macro lens.

As mentioned above, the steady lens data, which does not vary in accordance with the focal length, is stored in the ROM 30a at a predetermined address "00" thereof, and the variable lens data is stored at a different addresses "10" . . ., of the ROM 30a, respectively. The specific address data is stored at the addresses enclosed in parenthesis in Table B. The specific lens data at the focal length zones are stored at addresses in which the zoom code data is added to the address data.

In response to the data reading command from the camera body 1 (indication CPU 11), the lens CPU 30 reads the code of the code plate 37, the steady lens data stored in the page represented by the address "00," and also reads the variable lens data stored at the address enclosed in parentheses, where the data in accordance with the zoom code is added, so as to send the read data to the camera body 1. The data and the command signals transferred and received between the camera body 1 and the zoom lens 2 are shown in tables 4 and 5 below, by way of example.

TABLE 4

| lens → body | |
|---|---|
| AF information | 0011.0001(31H) |
| AE information | 0011.0010(32H) |
| all data | 0011.0011(33H) |
| each single bite | 0101.XXXX(5XH) |
| lens information 1 | 0110.0000(60H) |
| lens information 2 | 0110.0001(61H) |
| body → lens | |
| focal length information fWide | 0110.0010(62H) |
| focal length information fTele | 0110.0011(63H) |
| focal length information fX(present) | 0110.0100(64H) |
| lens drive information | 0110.0110(66H) |
| lens accommodation | 1001.0000(90H) |
| lens return | 1001.0001(91H) |
| PH ON | 1001.0010(92H) |
| PH OFF | 1001.0011(93H) |

TABLE 5

| | lens info. 1 60H | lens info. 2 61H | lens drive info. 66H |
|---|---|---|---|
| Bit7 | PH demand | LENS CPU | fw end |
| Bit6 | AF A/M | | fT end |
| Bit5 | PZ A/M | PZ in LENS | |
| Bit4 | PZ P/A | | |
| Bit3 | PZ MODE | | PZ Far |
| Bit2 | SET SW | | PZ Near |
| Bit1 | LENS A/M | LENS | |
| Bit0 | LENS O/C | version | |

Terminals P21 through P23 of the lens CPU 30 are connected to switches, such as an auto focus switch SWAF3 and power zoom switches SWPZ1 and SWPZ2, etc. Terminals P24 through P29 of the lens CPU 30 are connected to the zoom operation code plate 38.

Communication between Camera Body and Zoom ens

Zoom lens 2 has a clock pulse generating circuit 43 that functions as a clock signal generating means, which is connected to clock terminals X1 and X2 of the lens CPU 30. The lens CPU 30 operates synchronously with the clock pulses generated by the clock pulse generating circuit 43. As mentioned above, on the camera body side ( indication CPU 11), after terminal CONT drops to the level "L" and the open F-number is read, both terminals CONT and RES (Fmin3) become level "H" to reset the lens CPU 30.

When the reset is released, the lens CPU 30 calculates or reads the initial value data which is then asynchronously set (loaded) in a shift register in the lens interface 41 with the clock pulses outputted from the camera body 1. The set initial value data is successively outputted from the shift register 41 in accordance with clock signals of the camera body 1. This communication is carried out by the hardware of the lens interface 41. In the illustrated embodiment, specific arithmetic data for 19 bytes is sent to the camera body 1.

Upon completion of the communication (type communication), terminal $\overline{\text{KAFEND}}$ of the lens interface 41 becomes a level "L", which is a communication completion signal. Consequently, the lens CPU 30 waits for a renewal of data of the communication from the camera body 1.

When the lens CPU 30 receives the renewal communication data from the camera body 1, terminal DATA (Fmin2), which has been at level "H", becomes level "L" and then returns to level "H," so that the camera body can begin the new communication. Note that the respective states ("H" and "L") of terminals CONT and RES are held when the lens CPU 30 is first activated.

In the new data communication, the data is transferred from the zoom lens 2 to the camera body 1 or from the camera body 1 to the zoom lens 2, in accordance with a command code outputted from the camera body 1. The new data communication is carried out in accordance with the clock signal outputted from the zoom lens 2. For example, the lens CPU 30 outputs the clock signal from terminal $\overline{\text{SCK}}$ and then receives the data outputted from the camera body 1 through the terminal DATA thereof.

If the code is a test code, the lens CPU 30 outputs an acknowledgement signal from terminal DATA and then receives the zoom code outputted from the indication CPU 11 through terminal DATA and stores the zoom code signal in a RAM 30b. After that, an acknowledgement signal of completion of receipt of signal is issued from the lens CPU 30.

Thereafter, when the lens data is read in the state of the test mode, the lens CPU 30 outputs the lens data corresponding to the newly written data from terminal DATA. Upon completion of the output of the lens data, the lens CPU 30 sets the level of terminal DATA at "L" and then "H", so that the completion of the data output is transmitted to the camera body 1.

If the zoom lens 2 of the present invention is attached to an old type camera body, in which only the old communication is permitted, the old communication is performed in accordance with the clock signal outputted from the camera body. Conversely, if an old type photographing lens in which only old communication is permitted, is attached to the camera body 1 according to the embodiment of the present invention, the old communication is effected in accordance with the clock signal outputted from the camera body 1.

The following discussion will be directed to the communication between the camera body 1 and the zoom lens 2.

Input operation of Lens Data

The operation of the camera body 1 on the input operation of the lens data will be described below with reference to FIGS. 5, and 6A–6C. This operation is performed by the indication CPU 11.

Four lens flags FAE, FCPU, FLROM and FNO for discriminating the lens are set to be "0" (step S40). The lens flag FAE discriminates a conventional (old) type AE lens having no lens ROM; lens flag FCPU discriminates a new tpe AE lens having a lens CPU. An example of this would be the zoom lens 2 having the lens CPU 30, as shown in FIGS. 2 and 4, etc. Lens flag FLROM discriminates a conventional (old) type AE lens having a lens ROM, and lens flag FNO detects the absence of a lens or that the lens is not good (NG) for some reason.

After that it is checked whether lock flag FLOCK is "1" set to at step 41. If FLOCK is "0," control proceeds to step S42. Conversely, if FLOCK is "1," control jumps to step S53.

At step S42, terminals P10 through P12, which are used for serial communication with the zoom lens 2, are set to the input mode, and then, the level of terminal P16 (contact Cont) is inputted to check whether a reference voltage is supplied thereto (steps S43 and S44).

If there is no contact Cont on the mounted lens side, contact Cont on the camera body side comes into contact with the surface of the lens mount and is accordingly grounded to detect that the mounted lens is an old type AE lens having no lens ROM.

If the mounted lens is the old type AE lens, the levels of terminals P10 through P15 are inputted to read the data on the open F-number and the maximum F-number and the diaphragm A/M switching data, and the old AE lens flag FAE is set "1" ( steps S45 and S46 ). Then, control is returned.

If no photographing lens is mounted, or if a lens having the lens data is mounted, the level of the Cont contact is "H." Consequently, the level of terminal P16 falls to "L" in order to stop the supply of the electrical power to the lens side. Thereafter, the levels of the other terminals P10 through P15 are inputted (step S48).

As can be seen from FIG. 3, when the transistors Tr are connected to the lens contacts Fmin1 through Fmin3, the open F-number can be detected in accordance with the levels of the lens contacts Fmin1 through Fmin3 in combination, depending on the state (ON and OFF) of the transistors Tr in combination. The maximum F-number can be detected in accordance with the levels of the lens contacts Fmax1 and Fmax2 in combination, depending on the state (ON and OFF) of the switches SWFmax1 and SWFmax2 in combination. The level of the diaphragm A/M contact is used to detect whether the diaphragm is automatic or manual.

Thereafter, whether the levels of terminals P10 through P14 are all "H" is checked at step S48-2. If the levels of P10 through P14 are all "H," the no-lens flag FNO, which represents an absence of a lens, is set to "1" at step S52. Thereafter, control is returned.

If any of the levels of terminals P10 through P14 is "L," the level of terminal P16 is set to "H", so that electrical power is supplied to the zoom lens. Thereafter, the lens CPU and the lens ROM are activated and the levels of terminals P10 through P14 are inputted (steps S49 and S50).

Whether the levels of terminals P10, P11 and P12 are all "H" is checked at step S51. If any of the terminals P10 through P12 is "L", the photographing lens is considered to have trouble with the lens ROM and lens CPU, and accordingly, the no-lens flag FNO is set to "1" (step S52).

If the levels of the terminals P10 through P12 are all "H," it is determined at step S53 whether the levels of the terminals P13 and P14 are both "H". If the levels of the terminals P13 and P14 are both "H", it is considered that no lens is attached, so that the no-lens flag FNO is set and control is returned (steps S53 and S52).

If at least one of the terminals P13 and P14 is "L," the level of terminal P10 falls to "L" (step S54), and terminals P11 and P12 are set to the serial communication mode (step S55), since the mounted lens is a new AE lens (i.e., the zoom lens 2). Thereafter, control proceeds to step S56.

At step S56, whether the lock flag FLOCK is equal to "1" is checked. If FLOCK is "0," control proceeds to step S57, and if FLOCK is "1," control jumps to step S66.

At step S57, the lens data of 16 bytes and rear converter data of three bytes are inputted by the old communication.

When the inputting of the data by the old communication is completed, it is determined whether the lens is a new lens having the lens CPU (zoom lens 2), in accordance with a part of the inputted data at step S57-2. If the lens is not a new lens, flag FLROM is set, since the lens is a conventional AE lens having a lens ROM. (step S57-3).

Conversely, if the lens is the new lens, the new/old communication switching signal is output from terminal DATA (step S58) so that the clock demand signal is outputted to the lens side in response to the acknowledgement signal issued from the lens side. The lens CPU 30 then outputs the clock signal (steps S58 through S60).

Thereafter, a lens return command code 91H is sent to the lens CPU 30, which commences the return of the power zoom mechanism at step S61. Control waits until the acknowledgement signal is issued from the lens CPU 30 (step S62).

Thereafter, a lens return command code 91H is sent length data before accommodation (retraction) is sent to the lens CPU 30, which then performs the power zoom returning of the zoom lens to the focal length before the retraction operation (step S63). When the power zoom returning is finished, which can be detected by the issuance of the acknowledgement signal from the lens CPU 30, lock flag FLOCK is set at "1" (steps S64 and S65). Thereafter, control proceeds to step S66.

At step S66, a clock demand signal is outputted, so that the lens CPU 30 outputs the clock signal. Command code 60H is synchronously outputted with the clock signal, and control does not proceed until the acknowledgement signal is issued (steps S67 and S68). Command code 60H is used to read lens data, including the switch setting data, on the lens side and the power hold demand signal, etc.

Upon receipt of the acknowledgement signal, the lens data outputted from the lens CPU 30 is received (step S69). The completion of the receipt of the lens data is detected by the receipt of an acknowledgement signal fed from the lens CPU 30 (step S70).

Upon receipt of the acknowledgement signal, whether there is a power hold demand is checked at step S71. If there is a power hold demand, the lens CPU 30 is requested to output the clock signal ( step S72 ). Thereafter, the level of terminal P18 becomes "H" and control does not proceed until the acknowledgement signal is issued from the lens CPU 30 (steps S73 and S74).

Upon receipt of the acknowledgement signal, the power hold-on code 92H is outputted (step S75). Thereafter, control proceeds to step S81.

If there is no power hold demand at step S71, the output of the clock signal is demanded at step S76. Thereafter, the power hold-off code 93H is synchronously outputted with the clock signal (step S77). After that, whether the acknowledgement signal is outputted from the lens CPU 30 is checked at step S78.

Upon receipt of the acknowledgement signal, the level of terminal P18 becomes "L", after a lapse of a predetermined period of time (steps S79 and S80), so as to stop the supply of power to the PZ motor 34. Then, control proceeds to step S81.

At step S81, the output of the clock signal is demanded. The demand code 61H for demanding the lens data 2 is synchronously outputted with the clock signal at step S82. Thereafter, whether the acknowledgement signal is outputted is checked at step S83.

If the acknowledgement signal is received, the subsequent lens data 2 is received at step S84. Thereafter, whether the acknowledgement signal is outputted is checked at step S85.

If the acknowledgement signal is received at step S85, the clock signal is demanded at step S86. The demand code 33H for demanding all the data is synchronously outputted with the clock signal at step S87. Thereafter, whether the receipt acknowledgement signal is received is checked at step S88.

If the receipt acknowledgement signal is received, the subsequent data for 16 bytes is inputted at step S89. Thereafter, whether the transmission completion acknowledgement signal is received is checked at step S90.

If the transmission completion acknowledgement signal is received at step S90, whether or is a power hold demand is checked at step 91. If there is a power hold demand, the new AE lens flag FCPU is set to "1" (step S95), and control is returned.

Conversely, if there is no power hold demand at step S91, the clock signal is demanded at step S92 and a predetermined code is outputted (step S93). Thereafter, whether the receipt acknowledgement signal is received is checked at step S94.

Main Routine of Lens CPU

Figure 7:
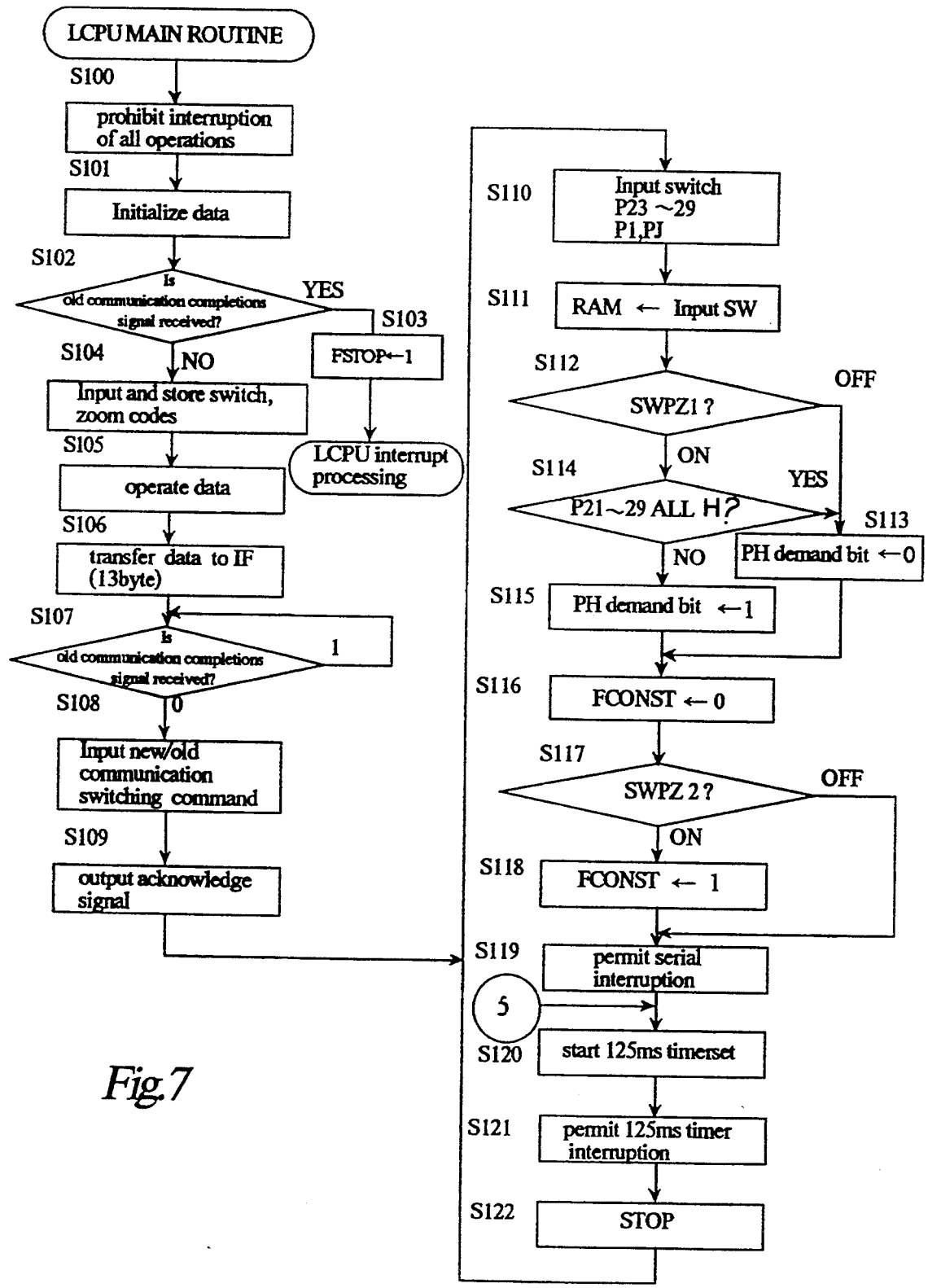
FIG. 7 is a flow chart of a main operation of the lens CPU.

The main operation of the lens CPU 30 will be described below with reference to FIG. 7. The lens CPU 30 is supplied with electrical power from the indication CPU 11 through terminal Cont, and starts when the reset is released after the levels of terminal Cont is set to "H" and terminal RES is set to "L".

The lens CPU 30 performs the initialization after an interruption by all of the operations is prohibited (steps S100 and S101).

After the initialization is completed, whether the old communication completion signal is outputted from the lens interface 41 is checked. That is, whether the level of terminal $\overline{\text{KAFEND}}$ is "L" is checked at step S102. If the old communication completion signal is outputted stop flag FSTOP is set to "1", and then, a lens CPU interruption starts (step S103).

Conversely, if no old communication completion signal outputted, which means that control is still in the old communication, the states of the switches are inputted and stored in the RAM 30b, to successively perform the predetermined arithmetic operations (step S105). During these operations, the initial value data is loaded in the 24 bit shift register in which the data is shifted and serially output to the indication CPU 11 by hardware.

Every time the predetermined arithmetic operations are finished, the results of the arithmetic operations (arithmetic data) are outputted to the lens interface 41 (step S106). The arithmetic data outputted to the lens interface 41 is then loaded in the 24 bit shift register after the initial data by hardware, and successively transferred to the indication CPU 11 through the terminal DATA.

Upon completion of the output of the arithmetic data to the indication CPU 11, whether the old communication completion signal is outputted is checked at step S107.

When the old communication completion signal is received, the arithmetic data transferred to the lens interface 41 is transferred to the indication CPU 11. If a rear converter is provided, the data for three bytes is transferred to the indication CPU 11 from the rear converter.

Upon completion of the transfer of the initial data of three bytes, the arithmetic data of 13 bytes, and the rear converter data of three bytes, the lens interface 41 (a $\overline{\text{KAFEND}}$ signal generating circuit not shown) outputs the old communication completion signal. Thereafter, when the indication CPU 11, which receives the old communication completion signal, receives the output new/old switching signal, the acknowledgement signal is issued (steps S108 and S109). Consequently, the control is ready for a new communication.

In the new communication, the levels of terminals P23 through P29 are inputted at step S110, and the states of the switches are memorized in the internal RAM (step S111).

Thereafter, the state of the power zoom switch SWPZ1 is checked to determine the power zoom mode or the manual zoom mode at step S112. If the power zoom switch SWPZ1 is turned OFF, the mode is the manual zoom mode, so that the power hold demand bit (flag) is set to "0" to stop the supply of power to the PZ motor 34. Thereafter, control proceeds to step S116.

If the power zoom switch SWPZ1 is turned ON, the mode is the power zoom mode. Accordingly, the levels of terminals P21 through P29 are inputted to check the states of the switches relating to the zooming operation (step S114). If the levels of all of the terminals P21 through P29 are "H," since no operation for the power zooming is effected, the power hold demand bit is set to "0". Thereafter, control proceeds to step S116.

If the level of any of the terminals P21 through P29 is "L," since the switch connected to the associated terminal relating to the power zooming is turned ON, the power hold demand bit is set to supply the PZ motor 34 with power (step S115). Thereafter, control proceeds to step S116.

At step S116, a constant image magnification flag FCONST is set to "0". Then, control proceeds to step S117. The constant image magnification flag FCONST detects whether the constant image magnification mode is set. In the illustrated embodiment, the constant image magnification mode referred to means a mode in which, when an object of an object distance D is in focus at a specific focal length f, even if there is a small change $\Delta D$ in the object distance, the power zooming is controlled to adjust the focal length f' to satisfy the following relationship;

$$D/f = (D + \Delta D)/f'$$

At step S117, whether the power zoom switch SWPZ2 is turned ON is checked. If the power zoom switch SWPZ2 is turned ON, the constant image magnification flag FCONST is set to "1." Then control proceeds to step S119. Conversely, if the power zoom switch SWPZ2 is turned OFF, control directly proceeds to step S119 without setting the constant image magnification flag FCONST to "1."

After that, at step S119, a serial interruption is permitted. Thereafter, a timer operation is set to intermittently perform the routine of steps S110 through S122 at a 125 ms cycle at steps S120 through S122. Thereafter, the operation stops. The lens CPU 30 performs the operations of steps S110 through S122 every 125 ms, in accordance with the setting of the timer operation.

Serial Interruption of Lens CPU

Figure 8A:
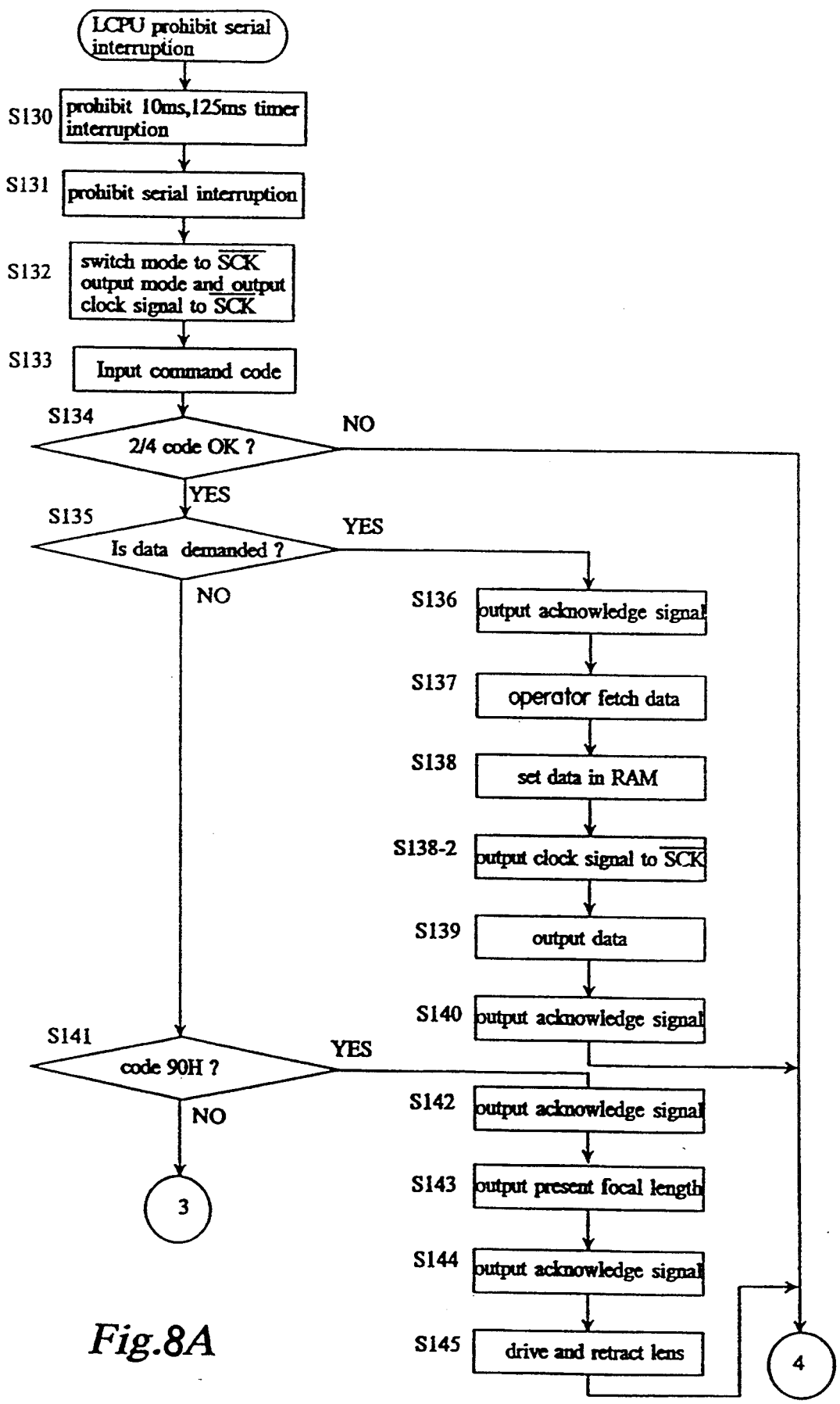
FIGS. 8A, 8B and 8C are flow charts of a communication operation on the photographing lens side; and, FIG. 9 is a flow chart of the data reading operation (lens data selection) in the present invention.
Figure 8B:
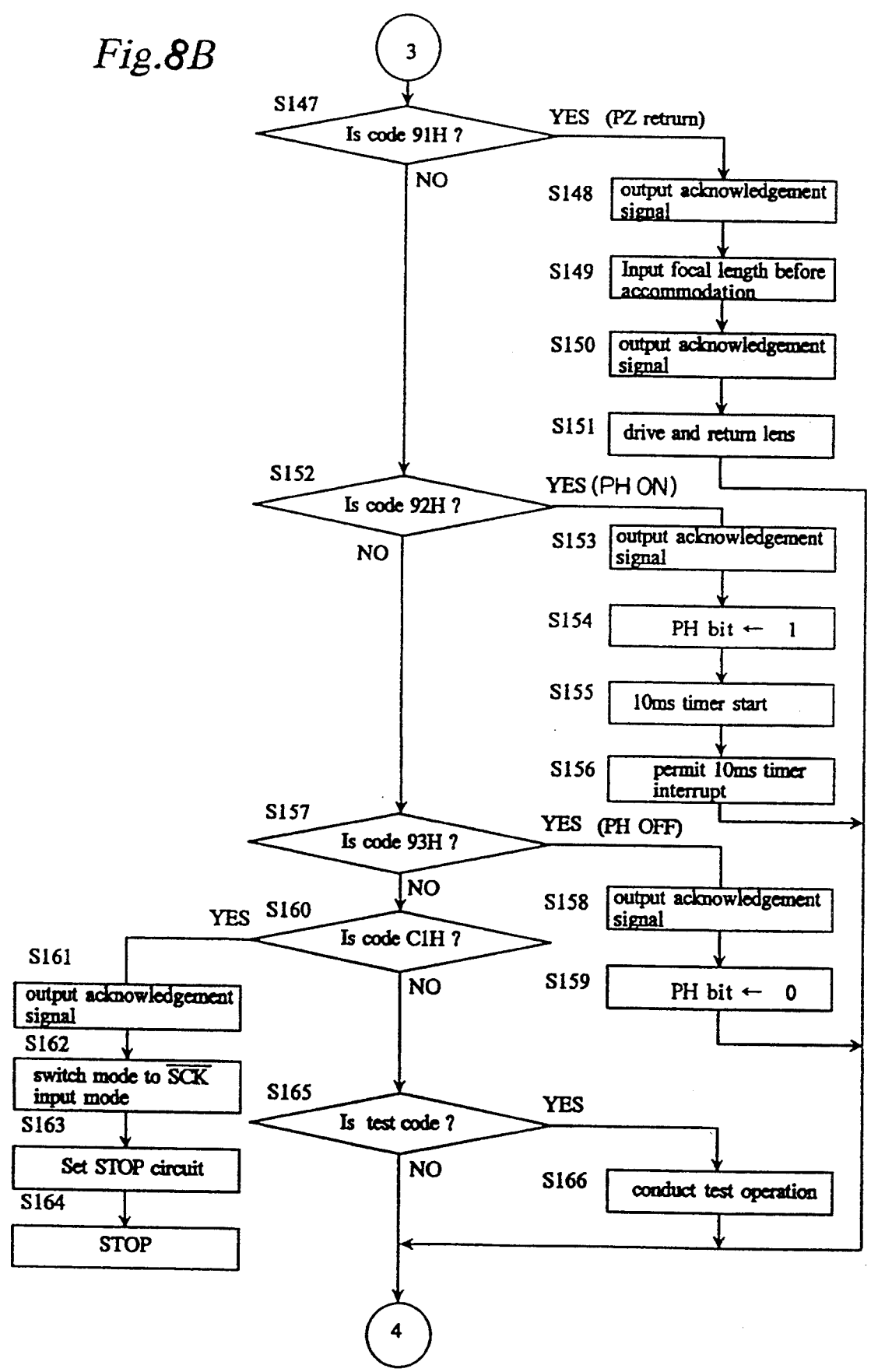
Figure 8C:
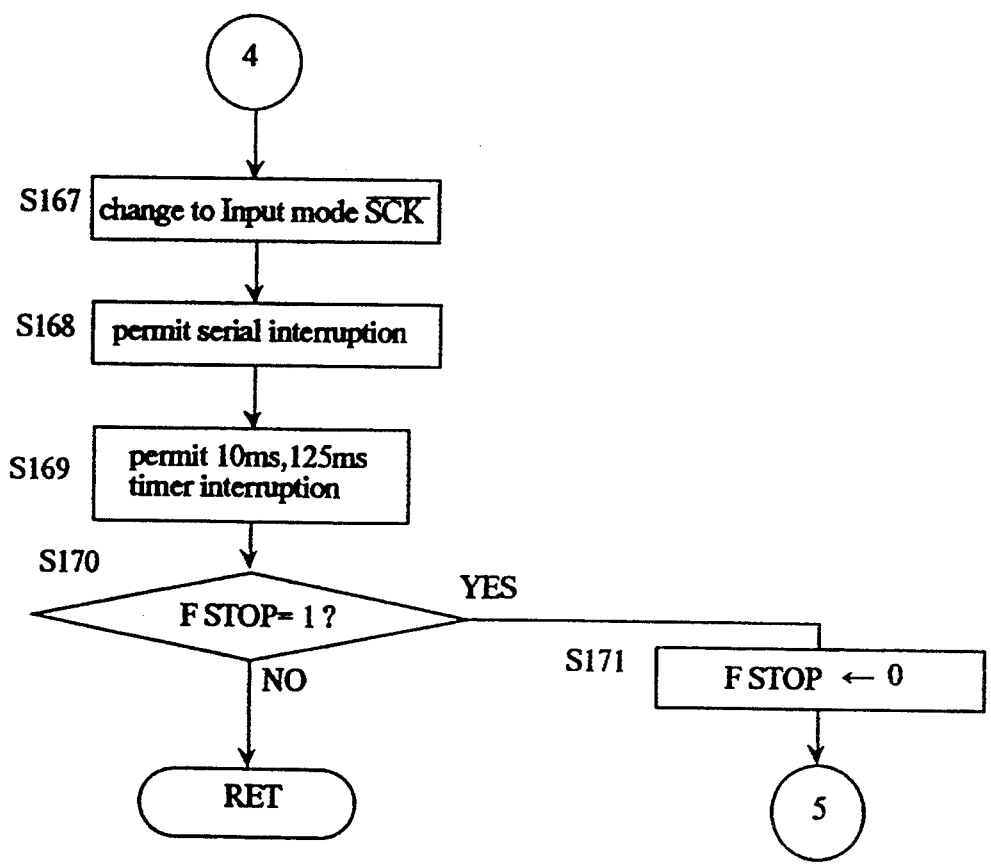

FIGS. 8A through 8C show flow charts for the new communication operation when the serial communication is interrupted by the indication CPU 11 of the camera body 1. When the indication CPU 11 causes the level of terminal DATA to fall to "L", the lens CPU 30 enters the new communication operation.

First, the lens CPU 30 prohibits the timer interruption by the 10 ms timer a 125 ms timer, and the serial interruption (steps S130 and S131). Note that the 10 ms timer interruption is a power zoom control operation, in which when the serial interruption is permitted, the power zooming is controlled at an interval of 10 ms.

Thereafter, the mode is switched to the $\overline{SCK}$ output mode in which the clock signal is outputted from the lens CPU 30 to output the serial clock signal to terminal $\overline{SCK}$ (step S132). Communication with the camera body 1 is carried out synchronously with the clock signal output from the photographing lens 2.

At step S133, a command code from the indication CPU 11 is inputted.

Thereafter, whether a the 2/4 code of the inputted command code is correct is checked at step S134. The 2/4 code means the first four bits of the command code, of which two bits are always "H" and the remaining bits (two bits) are always "L." If these requirements are not satisfied, operation is not performed, due to an input error of the command code and control jumps to step S167. At step S167, the mode is switched to the $\overline{SCK}$ input mode, in which the serial clock is inputted from the camera body side. Thereafter, the 10 ms timer interruption, the 125 ms timer interruption and the serial interruption are permitted (steps S168 and S169). At step S170, if the stop flag FSTOP is set to "0," the control is directly returned, while if stop flag FSTOP is set to "1," control is returned to step S120 of the CPU main routine shown in FIG. 7 after the stop flag FSTOP is set to "0" (step S171).

I f the 2/4 code is correct, the command code is checked at step S135 to determine whether it is the data demand signal. If the command code is the data demand signal, the acknowledgement signal is outputted to calculate the demanded data or to input the data of the code plate and the switches etc., so as to store the data in the internal RAM (steps S136 through S138).

The stored data is serially outputted synchronously with the $\overline{SCK}$ clock signal at step S138-2. Upon completion of the output of the stored data, the acknowledgement signal is outputted to complete the data transfer (steps S138-2, S139 and S140). Thereafter, control proceeds to step S167.

If the first four bits are not the command code, whether the latter is a code 90H, 91H, 92H, or 93H, or a sleep code or the test code is checked (steps S141, S147, S152, S157, S160 and S165).

If the command code is code 90H (lens accommodation or retraction), the acknowledgement signal is sent to the indication CPU 11 (step S142). Thereafter, the present focal length data is sent from the zoom code plate 37 to the indication CPU 11 (step S143). Upon completion of the feed of the focal length data to the indication CPU 11, the acknowledgement signal is outputted to accommodate or retract the zoom lens (steps S144 and S145). Thereafter, control proceeds to step S167.

If the command code is the code 91H (lens return), the receipt acknowledgement signal is sent to the indication CPU 11 (step S148). Thereafter, the focal length data before accommodation is inputted from the indication CPU 11 (steps S149). Upon completion of the inputted of the focal length data before accommodation, the acknowledgement signal is outputted to finish the inputting of the focal length data before accommodation (step S150). Thereafter, the PZ motor 34 is driven to set the focal length to be the focal length before accommodation at step S151. Thereafter, control proceeds to step S167.

If the command code is code 92H (power hold ON), the receipt acknowledgement signal is outputted at step S153. Thereafter, the power hold demand bit PHbit is set to "1" (step S154), and the 10 ms timer starts to permit the 10 ms timer interruption (steps S155 and S156). Thereafter, the control proceeds to step S167.

If the command code is code 93H (power hold OFF), the acknowledgement signal is outputted (steps S157 and S158), and the power hold bit is set to "0" (step S159). Thereafter, the control proceeds to step S167.

If the command code is neither code 90H, 91H, 92H or 93H, whether the command code is a sleep code C1H is checked at step S160. If the command code is the sleep code C1H, the receipt acknowledgement signal is outputted to change the mode to the $\overline{SCK}$ input mode, in which the level of terminal $\overline{CE}$ falls to "L" (steps S161 and S162). Thereafter, control stops and sleeps (step S164).

If the command code is not the sleep code C1H, whether the command code is test code FXH is checked at step S16S. If the command code is the test code FXH, the test operation is performed at step S166, and then, control proceeds to step S167. If the command code is not the test code FXH, control skips step S166 and proceeds to step S167. The test mode is not used during the taking of a picture, but is used to effect a predetermined data communication, without the need to mount the photographing lens to the camera body, for example, upon assembly of the lens or adjustment thereafter, etc.

At step S167, the mode is changed to the $\overline{SCK}$ input mode, in which the clock signal can be received from the indication CPU 11. Thereafter, the serial interruption, the 10 ms timer interruption and the 125 ms timer interruption are permitted (steps S168 and S169).

Thereafter, at step S170, whether stop flag FSTOP is set to "1" is checked. If FSTOP is "1," it is set to "0" (step S171). Control is then returned to step S120 of the main routine of the lens CPU (FIG. 7). Conversely, if FSTOP is "0" at step S170, control is returned.

Data Setting of Lens CPU

Figure 9:
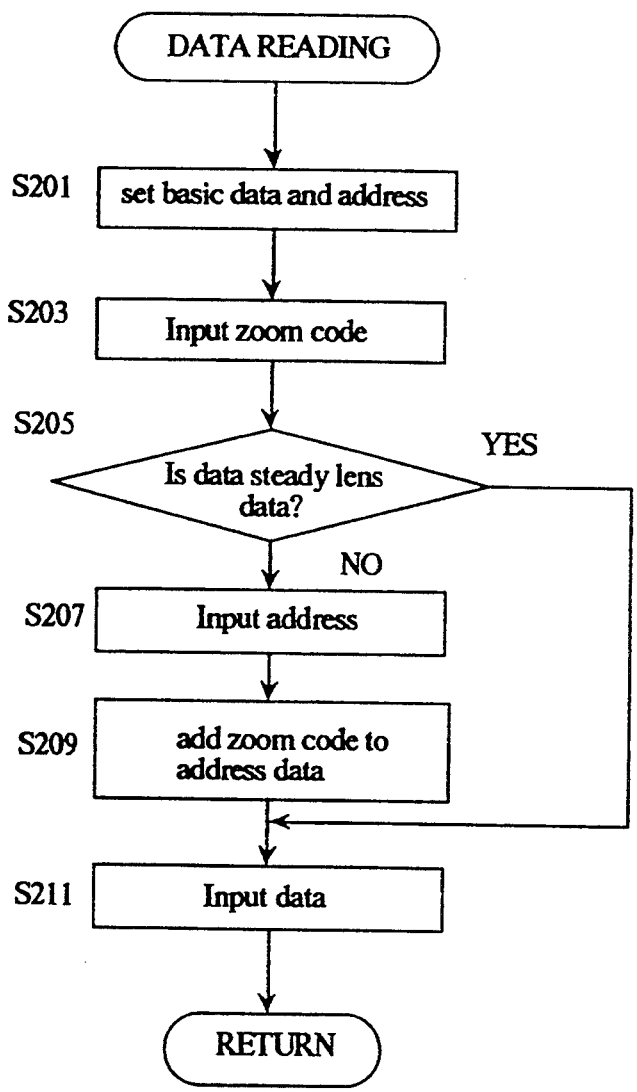

The selection operation of the lens data, which varies during zooming, will be described below with reference to FIG. 9. This operation interrupts the operation shown in FIG. 8A at step S137 thereof.

The basic data address is set at step S201 and the zoom code is inputted from the zoom code plate 37 at step S203.

Thereafter, whether the data demanded by the camera body 1 is the steady lens data is checked at step S205. If the data is not the steady lens data, the address data stored at the corresponding address of the steady data memory group is inputted (step S207). Then, the stored zoom code data is added to the address data (step S209). The lens data stored at the summed address is the inputted at step S211. Thereafter, control is returned. The address data and the zoom code data are such that the sum of these data corresponds to the address at which the variable lens data corresponding to the actual focal length is stored.

If the data demanded by the camera body 1 is the steady lens data at step S205, the lens data stored at a predetermined address of the basic data group is inputted and control is then returned.

Thus, the lens data demanded by the camera body 1 can be read from the ROM 30a and written into the RAM 30b at step S138. The written data is then transferred to the camera body 1 in the subsequent operations, as mentioned above.

As can be understood from the above discussion, according to the present invention, a group of steady lens data which is fixed for each photographing condition, or requirement, can be stored in the steady data storing area, and the specific address at which the lens data corresponding to each photographing condition is stored is fixed.

Among the lens data groups, a group of steady lens data which does not vary in accordance with the change of the photographing conditions, for example, the focal length data, is stored at the specific address.

On the other hand, variable lens data which varies in accordance with the focal length or the like is stored for each unit focal length at predetermined addresses of different variable lens data storing areas.

Predetermined address data is stored at a blank address of the steady data storing area and the zoom code data read from the zoom code plate 37 is added to the predetermined address data so that the address data in which the variable lens data to be inputted to the address is stored can be obtained.

According to the present invention, all of the different variable lens data depending on the focal length zones is stored, but only one set of steady lens data, common to the focal length zones, is stored. Accordingly the memory can be small. This makes it possible to store all the lens data in the internal ROM 30a of the lens CPU 30.

Although the zoom code data is added to the specific address data to obtain the address of the variable lens data in the above-mentioned embodiments, the addition can be replaced with subtraction, multiplication or division.

Although the illustrated embodiments are applied to the variable lens data which varies in accordance with the focal length, the invention can be applied to the lens data which varies in accordance with the object distance.

As can be seen from the foregoing, according to the present invention, among the lens data peculiar to the associated photographing lens, only one group of steady lens data which does not vary in accordance with the photographing conditions is commonly stored in the steady data storing area of the memory. The variable lens data which varies in accordance with the photographing conditions is stored in other storing areas. Accordingly, the memory can be made small in comparison with the prior art, in which all the lens data corresponding to each of the photographing conditions must be stored.

We claim:

1. A photographing lens adapted to be detachably attached to a camera body, comprising:

memory means for storing respective steady lens data in a group of steady lens data that are constant regardless of photographing conditions, and variable lens data that vary in accordance with said photographing conditions, said respective steady lens data being stored at first predetermined addresses in a steady lens data area of said memory means, respectively, said variable lens data being stored in a variable lens data area of said memory means different from said steady lens data area; and data reading means for reading the data stored in said memory means; and said group of steady lens data further comprising address data for identifying said variable lens data area, said address data being stored at second predetermined addresses in said steady lens data area of said memory means;

whereby respective variable lens data are read by said data reading means based upon said address data read from said second predetermined addresses and said photographing conditions.

2. A photographing lens according to claim 1, wherein said photographing lens is a zoom lens.

3. A photographing lens according to claim 2, further comprising photographing condition detecting means for detecting a focal length of said zoom lens.

4. A photographing lens according to claim 3, wherein said photographing condition detecting means comprises a zoom code in which the focal length of said zoom lens is divided into a plurality of focal length zones.

5. A photographing lens according to claim 4, wherein said steady lens data stored in said first predetermined addresses of said steady lens data area are common to all of said plurality of focal length zones, and said variable lens data stored in said variable lens data area are selectively read by said reading means according to each of said plurality of focal length zones.

6. A photographing lens according to claim 4, said zoom code defining data of said focal length zones, wherein said photographing condition detecting means further comprises means for reading said data from said zoom code, said first predetermined addresses in said steady lens data area being determined by adding said zoom code data to said address data so that said respective variable lens data may be read.

7. A photographing lens adapted to be detachably attached to a camera body, comprising:

memory means for storing steady lens data that are constant regardless of photographing conditions, and variable data that vary in accordance with said photographing conditions, said respective steady lens data being stored at first predetermined addresses in a steady lens data area of said memory means, said variable lens data being stored in a variable lens data area of said memory means different from said steady lens data area, said memory means further comprising means for storing address data for identifying said variable lens data area, said address data being stored at second predetermined addresses in said steady lens data area; and reading means for reading said steady lens data and said address data stored in said steady lens data area, and for reading respective variable lens data based upon said address data read from said second predetermined addresses and said photographing conditions.

8. A photographing lens according to claim 7, wherein said photographing lens is a zoom lens.

9. A photographing lens according to claim 8, further comprising photographing condition detecting means for detecting a focal length of said zoom lens.

10. A photographing lens according to claim 9, wherein said photographing condition detecting means comprises a zoom code in which the focal length of said zoom lens is divided into a plurality of focal length zones.

11. A photographing lens according to claim 10, wherein said steady lens data stored in said first predetermined addresses of said steady lens data area are common to all of said plurality of focal length zones, and said variable lens data stored in said variable lens data area are selectively read by said reading means according to each of said plurality of focal length zones.

12. A photographing lens according to claim 10, said zoom code defining data of said focal length zones, wherein said photographing condition detecting means further comprises means for reading said data from said zoom code, said first predetermined addresses in said steady lens data area being determined by adding said zoom code data to said address data so that said respective variable lens data may be read.

* * * * *